United States Patent [15] 3,675,110
Kelley, Jr. [45] July 4, 1972

[54] MEANS FOR DAMPING VOLTAGE OSCILLATIONS IN SOLID-STATE SWITCHING CIRCUITS

[72] Inventor: Fred W. Kelley, Jr., Media, Pa.
[73] Assignee: General Electric Company
[22] Filed: Jan. 27, 1971
[21] Appl. No.: 110,165

[52] U.S. Cl. .................... 321/14, 321/5, 321/27 R, 321/45 C
[51] Int. Cl. ........................................ H02m 1/18
[58] Field of Search .............. 321/5, 11, 12, 14, 27 R, 45 C

[56] References Cited

UNITED STATES PATENTS

| | | |
|---|---|---|
| 3,391,327 | 7/1968 | Pelly ................................. 321/27 R |
| 2,730,667 | 1/1956 | Uhlmann .......................... 321/11 X |
| 3,525,100 | 8/1970 | Duff .................................. 321/45 C |
| 3,332,000 | 7/1967 | Greening et al ................... 321/11 X |
| 3,532,901 | 10/1970 | Hylten-Cavallius et al ........ 321/11 |
| 3,569,819 | 3/1971 | Martzloff et al. .................. 321/12 |

Primary Examiner—William M. Shoop, Jr.
Attorney—J. Wesley Haubner, Albert S. Richardson, Jr., Frank L. Neuhauser, Oscar B. Waddell and Joseph B. Forman

[57] ABSTRACT

A thyristor is serially joined to an inductor and is shunted by a snubber circuit comprising a resistor in series with a capacitor. When subjected to a stepped change in voltage, the series combination of the inductor and the snubber circuit may become oscillatory. To prevent the voltage across the thyristor from undesirably overshooting, a tuned damping circuit is connected in parallel with the inductor, or alternatively in parallel with the snubber circuit.

9 Claims, 3 Drawing Figures

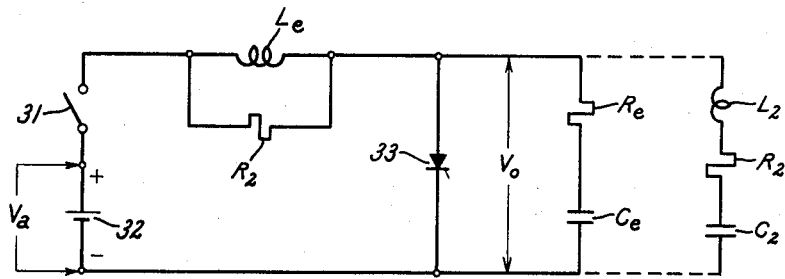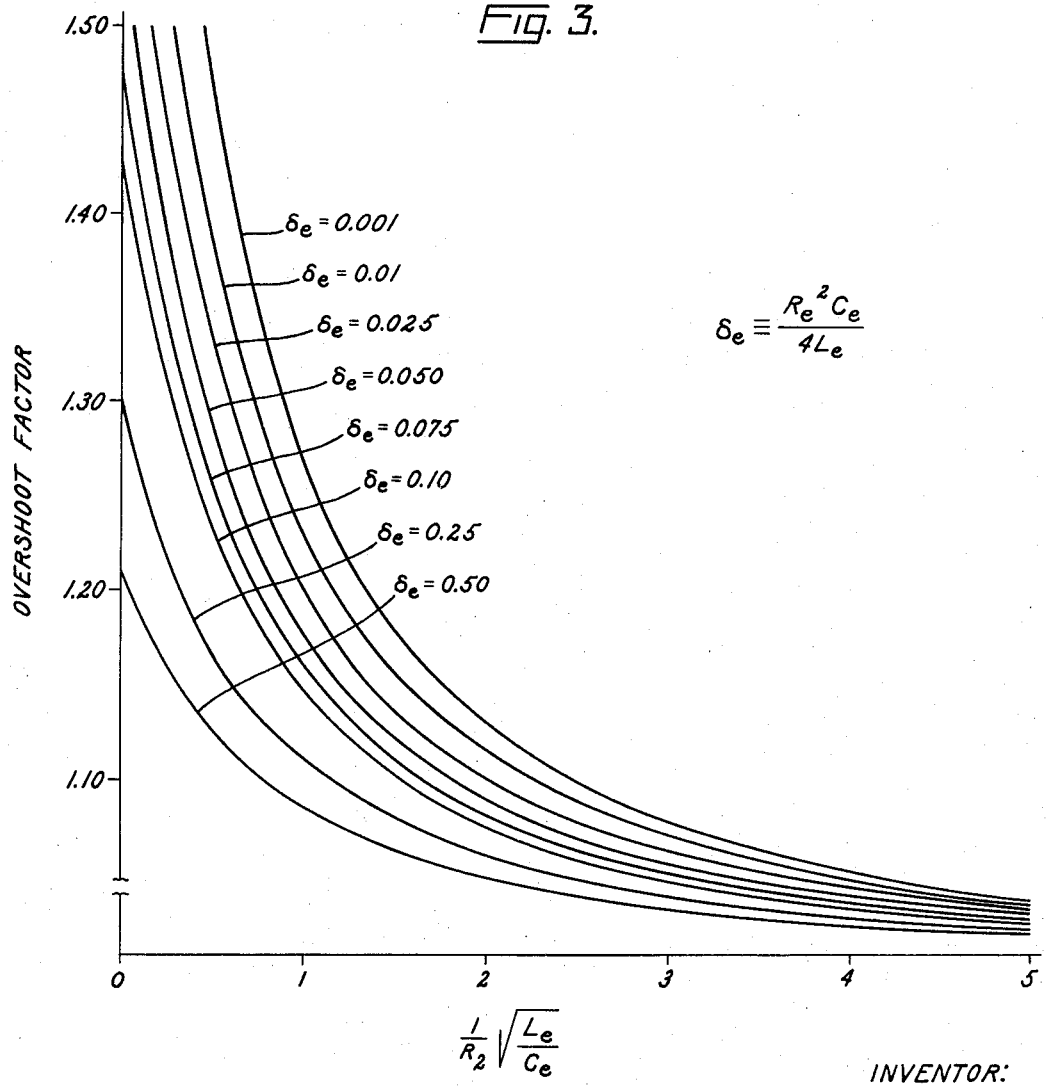

MEANS FOR DAMPING VOLTAGE OSCILLATIONS IN SOLID-STATE SWITCHING CIRCUITS

This invention relates to solid-state switching circuits, and, more particularly, it relates to electric power conversion apparatus in which said circuits are used.

There are many known power conversion circuits for changing the form of electric power from direct current to alternating current, from alternating current to unipolarity or bipolarity direct current, or from polyphase alternating current of fundamental frequency to single-phase or polyphase alternating current of a different frequency. Such apparatus are popularly referred to as inverters, rectifiers, reversing rectifiers, cycloconverters, or direct frequency changers (or multipliers). In each case the conversion is accomplished by appropriately controlling a plurality of periodically conducting, sequentially fired electric valves that are interconnected in a bridge configuration between d-c and a-c terminals, the latter being adapted to be connected to a system of alternating voltage with which the valve firings are synchronized.

In modern practice each valve typically comprises one or more solid-state gate-controlled switching components known as semiconductor controlled rectifiers or thyristors. A conventional thyristor is physically characterized by a body of monocrystalline silicon between a pair of main current-carrying metallic electrodes known as the anode and the cathode, respectively. The silicon body may comprise, for example, a thin, broad area disc-like wafer having four layers of alternately P and N type conductivities, whereby three back-to-back PN (rectifying) junctions are formed between the main electrodes. Usually the wafer is mechanically sealed in an insulating housing and is electrically connected in an external power circuit by way of its anode and cathode, and the device is equipped with suitable gating means for initiating conduction between these main electrodes on receipt of a predetermined control or trigger signal.

In operation, each valve of the converter has a nonconducting or blocking state in which it presents very high impedance to the flow of current, and a conducting or turned-on state in which it freely conducts forward current between its main electrodes. It can be switched abruptly from the former state to the latter by applying a trigger signal to its gate when its main electrodes are forward biased (anode voltage positive with respect to cathode). This switching or "firing" action is ordinarily controlled by associated regulating and control circuits which supply a train of properly timed and dimensioned gate pulses to the valve. In many converters the moment of time at which the valve is fired is expressed in electrical degrees (known as the "firing angle") measured from the cyclically recurring instant at which its anode voltage first becomes positive with respect to cathode, and the magnitude of the output voltage of the converter can be varied by retarding or advancing the firing angle as desired. Once turned on, a valve will continue conducting until "forward" current is subsequently reduced below a given holding level by the action of the external circuit in which the valve is conneCted. This turn-off process is referred to generally as "commutation." A variety of line and load voltage commutated converters and forced commutated inverters are well known in the art.

During commutation, current in a solid-state valve will actually decrease to zero and then reverse directions for a brief moment of time until the rectifying junctions inside the thyristors forming that valve have recovered their ability to withstand reverse voltage, whereupon the valve suddenly regains its reverse blocking state. Since there is always some circuit inductance in series with the valve, any sudden cessation of current can lead to undesirable voltage transients across the valve. To suppress such transients, it is common practice to shunt the valve with a so-called "snubber" circuit comprising a capacitor and a resistor in series.

Snubber circuits are also beneficial in certain inverter applications where a valve is subjected to a very high time rate of rise of forward anode voltage at the conclusion of an interval of conduction. Persons skilled in the art are aware that a thyristor can be turned on without a gate pulse by allowing its anode voltage to increase to a predetermined breakover level ($V_{BO}$) or at a rate ($dv/dt$) in excess of a certain critical value. If the $dv/dt$ duty imposed on a thyristor exceeds this critical rate, there is a danger of premature refiring and consequent failure of the inverter mechanism.

The snubber circuit is designed to limit the maximum rate of change of voltage across the valve whenever reverse recovery current terminates therein or a stepped forward voltage is applied thereto. The snubber capacitor and resistor should be coordinated with the external power circuit inductance to provide a slightly underdamped series RLC circuit. There are a number of interrelated and sometimes competing factors that affect the choice of values of snubber resistance and capacitance, the principal tradeoffs being $dv/dt$ suppression, damping, and efficiency. For example, low resistance is desirable for the sake of low losses and to reduce the steepness of the initial $dv/dt$ imposed on the valve. On the other hand, higher resistance helps to limit the initial inrush of current contributed to the valve by the discharge of the snubber capacitor when the valve turns on, and it also helps to dampen oscillations and thereby limit anode voltage overshoot following turn off of the valve.

One objective of the present invention is to provide improved damping means, useful in combination with thyristors which are protected by prior art snubber circuits, for controlling anode voltage overshoot with relatively low initial cost and operating losses.

I have found that in some conversion apparatus the series RLC circuits in an inactive section of the converter, which circuits are formed by the interaction of the power circuit inductance and the snubber resistance and capacitance across turned-off valves of the inactive section, can become oscillatory on the occasion of step changes in the voltage thereacross due to switching in another section of the converter. Such oscillations or ringing can cause overshoot of anode voltage on a turned off valve. Anode voltage overshoot is undesirable because it tends to overstress the snubber resistors, and if the anode voltage rises too fast or too high there is a risk of improper firing of the valve. Accordingly, it is another objective of my invention to provide improved means for damping such oscillations without introducing appreciably higher losses in the apparatus.

A general object of the invention is to provide an improved damping circuit which is useful in a variety of solid-state switching circuits that are subject to relatively abrupt changes of voltage.

In carrying out my invention in one form, a capacitive reactance element, which is part of a snubber circuit for a thyristor, is serially connected with an inductive reactance element in a circuit which is subject to relatively abrupt changes of voltage, and oscillation in the circuit is damped by connecting across one of the aforesaid reactance elements the series combination of a resistance, an inductance, and a capacitance. The ohmic value of the resistance is selected to damp oscillations in the circuit on the occasion of the aforesaid abrupt voltage change, and the inductance and capacitance are tuned to approximately the natural frequency of the circuit. As a result of this tuning, the resistance can have a relatively low power rating, and it does not add appreciable losses to the circuit except during said oscillations.

My invention will be better understood and its various objects and advantages will be more fully appreciated from the following description taken in conjunction with the accompanying drawing in which:

FIG. 2 is an equivalent circuit diagram of an oscillatory circuit that exists in the FIG. 1 apparatus; and FIG. 3 is a graph useful for selecting the ohmic value of the resistance needed in my damping means to yield a predetermined overshoot factor, given the damping factor of the equivalent circuit.

Figure 1:
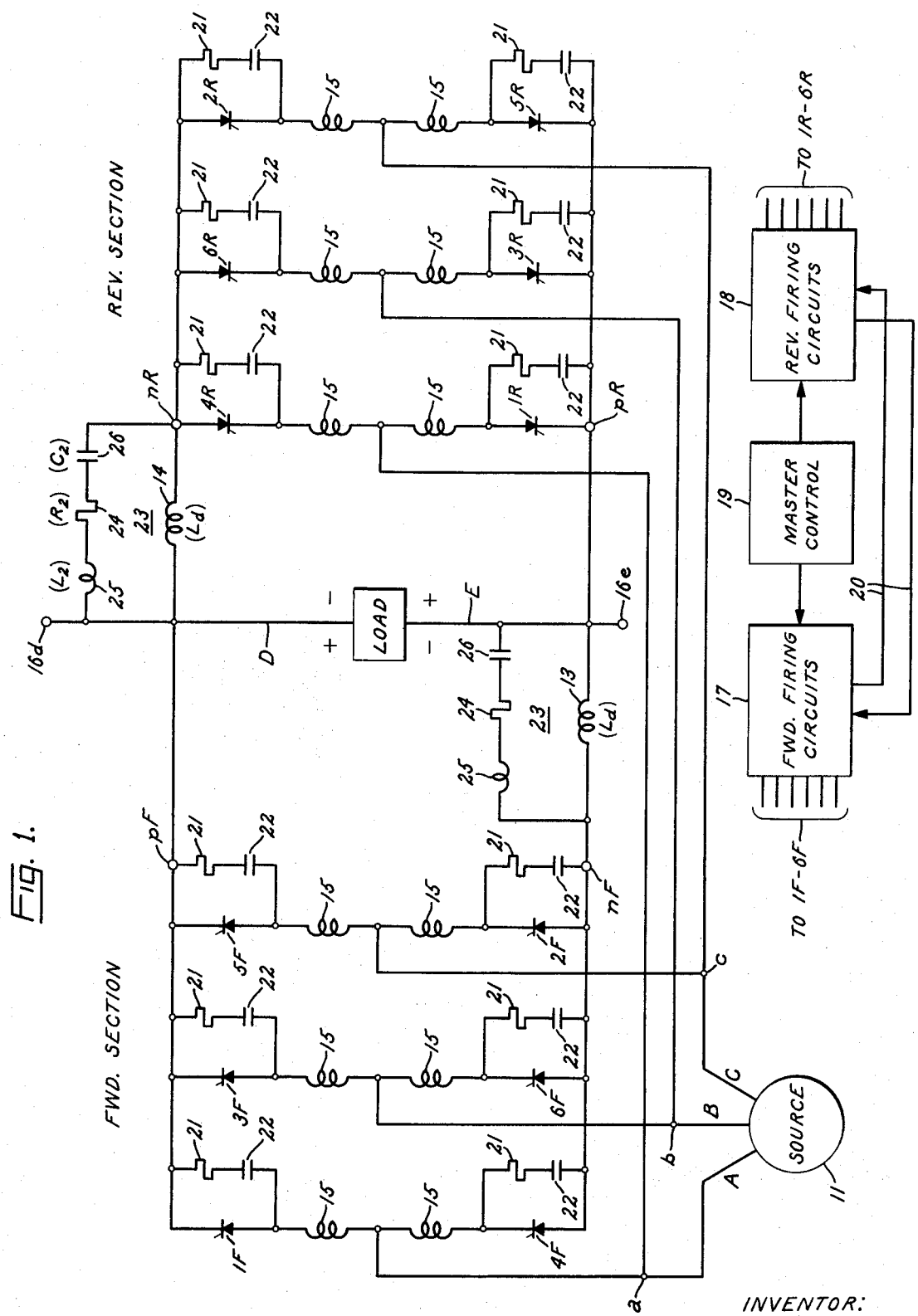
FIG. 1 is a schematic diagram of two three-phase, double-way, six-pulse bridges interconnected to form a reversing rectifier or cycloconverter type of conversion apparatus with which my damping means is advantageously used in practice.

For purposes of illustrating the presently preferred embodiment of my invention, I have shown in FIG. 1 two duplicate bridges which are part of electric power conversion apparatus that controls the interchange of power between a source 11 and a load 12. These bridges comprise, respectively, the "forward section" and the "reverse section" of a whole converter. As shown, each bridge comprises a group of six identical electric valves connected in a conventional three-phase, double-way, six-pulse configuration between three a-c terminals and a pair of d-c terminals. The same valves could be alternatively arranged in other known configurations, such as six-phase, single-way, six-pulse bridges. Preferably both bridges share the same a-c terminals $a$, $b$, and $c$ which serve as input terminals for the illustrated converter, and accordingly the source 11 is connected to these terminals for supplying them with three-phase sinusoidal voltage which alternates at a fundamental frequency such as 60 hertz. Usually the source is coupled to the conversion apparatus by means of power transformer windings (not shown), and it is common practice to provide overcurrent protective means for suppressing the firing of the valves, thereby turning off the converter, in response to excessively high current in the source connections.

The d-c terminals of the illustrated bridges serve as the converter output terminals. As is shown in FIG. 1, the forward and the reverse bridges of the converter have separate sets of output terminals which are connected in oppositely poled relationship to the load 12. A first output terminals $pF$ of the forward bridge has a positive polarity and is connected directly to one side D of the load circuit, while the other output terminal $nF$ of the same bridge is negative and is connected via a current-limiting inductive reactance element 13 to the other side E of the load circuit. On the other hand, the first or positive output terminal $pR$ of the reverse bridge is connected directly to the latter side E of the load circuit, and the second or negative output terminal $nR$ of this bridge is connected via another current-limiting inductive reactance element 14 to the one side B. Thus current can flow through the load circuit in a predetermined positive or forward direction when the forward bridge is active or in a negative or reverse direction when the reverse bridge is active. The load 12 may comprise the armature of a variable speed, reversible d-c motor, or it may include one or more windings of a variable speed, multi-winding a-c motor.

In normal operation the two bridges of the converter are alternatively active. In the abnormal event of simultaneous conduction by valves in both bridges, the inductors 13 and 14 which are connected between the bridges will limit short circuit current and thereby prevent serious damage to the valves while the converter is being turned off by the overcurrent protective means.

The six valves of the forward bridge have been identified by the reference 1F through 6F, respectively. The cathodes of the odd-numbered valves are connected in common to the positive terminal $pF$ of this bridge, and the anodes of the even numbered valves are connected in common to the negative terminal $nF$. The anode of valve 1F and the cathode of valve 4F are both connected via the first a-c terminal $a$ of the converter to phase A of the alternating voltage source 11. The anode of valve 3F and the cathode of valve 6F are both connected via a second a-c terminal $b$ to phase B of the source, and the anode of valve 5F and the cathode of valve 2F are both connected via the third a-c terminal $c$ to the third phase V of the source.

While each of the valves in the forward bridge is illustrated by a single symbol, in practice it often comprises a plurality of separate thyristors connected in series and/or in parallel with one another and suitably arranged to operate in unison. Where thyristors are paralleled, it is customary to connect current balancing inductors in series therewith, and in FIG. 1 such inductors are shown symbolically at 15. For very high current loads, extra bridges can be provided, with their output terminals respectively coupled to terminals 16$d$ and 16$e$ so as to supply additional unidirectional current to the connected load. If the input voltages and the valve firings of a second forward bridge are phase displaced 30 electrical degrees with respect to the corresponding quantities of the illustrated bridge, a 12-pulse converter is formed, in which case the inductors 13 will perform the function of an interphase reactor.

The conversion apparatus includes control means for periodically switching the respective valves of the forward bridge from blocking states to forward current conducting states. Toward this end, an appropriately timed family of discrete gate pulses is cyclically generated and sequentially applied to the respective control electrodes (gates) of the valves 1F–6F, whereby the valves are triggered in numerical sequence in synchronism with the alternating voltage of the source (a conventional phase rotation A–B–C is assumed), and the flow of power through the forward bridge is controlled as desired. Firing circuits 17 of suitable design are used for generating and distributing the requisite gate pulses and for determining their characteristic firing angle.

The six valves of the reverse bridge have been identified by the reference characters 1R through 6R, respectively, and they are interconnected and arranged similarly to the valves of the companion forward bridge. The firing circuits 18 associated with the reverse bridge are similar in function and operation to the forward firing circuits 17.

Master control means 19 is provided for alternatively activating the two firing circuits 17 and 18 and for varying their respective firing angles as desired. The average magnitude of voltage applied to the load circuit can be reduced from maximum to zero by retarding the firing angle from 0° toward 90°. It will be understood that the master control block 19 represents suitable control, regulation, and restraint circuitry to command the proper firing circuits 17 or 18 to initiate conduction of the valves of the associated bridge at the proper firing angle to vary the direction and magnitude of current delivered to the load 12 according to a preset or manual program. Once turned on, each valve in turn will continue conducting until forward current therein is decreased to zero by a cyclic commutation process, and each conducting period is immediately followed by an interval of reverse anode-to-cathode voltage across that valve. It is common practice in the relevant art to provide interlock means 20 so that the operation of the forward firing circuits 17 is always inhibited or suppressed whenever reverse current is being conducted by the reverse bridge and so that operation of the reverse firing circuits 18 is always inhibited or suppressed whenever forward current is being conducted by the forward bridge. More information about the function of the interlock means and a useful embodiment thereof can be obtained from copending patent application Ser. No. 836,765 filed on June 26, 1969, for G.R. Lezan and myself and assigned to the General Electric Company.

As can be seen in FIG. 1, each valve in the conversion apparatus is shunted by a snubber circuit comprising a resistor 21 in series with a capacitive reactance element 22. The purpose of the snubber circuit was explained in the introductory portion of this specification, and it is well understood by persons skilled in the art. Where thyristors are seriesed to form a valve, each is shunted by an individual snubber circuit, in which case these circuits will form an R–C bypass network which serves the additional beneficial purpose of forcing transient and steady-state voltage sharing among the seriesed thyristors.

During operation of the illustrated converter, the respective valves of a bridge are fired in numerical sequence as previously explained. Assume that the forward section is active and that the valves 1F and 2F are conducting load current. In this recurrent state of the switching means, the output terminal $pF$ will be energized in accordance with the electrical potential of the first input terminal a (i.e., phase A of the source 11). Valve 3F is the next one to operate, and after it has been fired the output terminal $pF$ is energized in accordance with the electric potential of the input terminal $b$ (phase B of the source 11). If the firing angle is very retarded, this change in state of the switching means will occur at a time when the magnitude of the phase B voltage is appreciably higher than that of the phase A voltage. As a result, it is accompanied by a relatively abrupt change of the voltage across the inactive inductor 14 in series with the respective even-numbered valves in the reverse section of the inverter.

In particular, the voltage across the series combination of the inductor 14 and the snubber circuit 21, 22 shunting the valve 4R, which combination is connected between terminals $pF$ and $a$, is subject to stepped increases equal to the difference between the phase B voltage and the phase A voltage at the time commutation occurs from valve 1F to valve 3F. Assuming that valve 3F was turned on at a retarded firing angle, the voltage increase can be relatively great and commutation will be completed rapidly, and there is consequently a tendency for this series RLC combination to be oscillatory or to ring and for the voltage across the thyristors in the valve 4R to rise to an even higher magnitude. Anode voltage overshoots of as high as 60 percent have been observed in practice. This undesirably stresses and weakens the resistors 21 in the snubber circuits. Where each valve comprises two or more thyristors in series and the snubber resistor across one of the thyristors fails (becomes open circuited), all of the voltage will then be impressed on that one thyristor which may then turn on by $V_{BO}$ or $dv/dt$ action, whereupon the remaining thyristor is similarly fired. As a result of simultaneous conduction by valves in the forward and reverse bridges, the source 11 is short circuited and the overcurrent responsive protective means will suppress all valve firings, thereby shutting down the converter. This deenergizes the load 12 at a time that may be harmful to the machinery or process being driven thereby.

In accordance with my invention, the voltage overshoot problem reviewed in the preceding paragraph is solved by shunting either the inductor 14 or the snubber circuit 21, 22 with a tuned damping circuit 23 characterized by resistance, inductance, and capacitance in series with one another. The resistance has an ohmic value selected to damp oscillations in the above-mentioned series combination on the occasion of a stepped voltage increase, and the inductance and capacitance are tuned to approximately the natural frequency of the series combination. Additional information regarding the selection of parameters will be set forth soon hereinafter. In the illustrated converter, the tuned damping circuit 23 is shown connected in parallel with inductor 14. There is a duplicate circuit 23 in parallel with the inductor 13 to dampen oscillations in the forward bridge while the reverse bridge is active. As indicated in FIG. 1, each of the damping circuits 23 comprises a resistor 24 of $R_2$ ohms in series with an inductor 25 of $L_2$ henries in series with a capacitor 26 of $C_2$ farads. For a better understanding of the criteria for selecting these parameters, FIGS. 2 and 3 have been included in the drawing, and they will now be described.

In FIG. 2 an equivalent circuit of the FIG. 1 converter is shown. The switch 31 is equivalent to the controllable switching means or valves of the forward section of the converter, and the closure of this switch corresponds, for example, to the firing of valve 3F and rapid commutation from phase A to phase B of the source 11 in FIG. 1. The battery 32 in FIG. 2 is a source of voltage ($V_a$) equal to the voltage between phase B and phase A when the switch 31 is closed. The equivalent inductance $L_e$ equals the sum of the inductances of the current limiting reactive element 14 and the balancing reactors 15. (As a first approximation, $L_e$ can be considered the same as $L_d$ which is the inductance of the current-limiting inductor and is usually much larger than that of the balancing reactors.) The thyristor 33 represents a turned-off valve (e.g., 4R) in the reverse section of the converter, and $V_o$ is the "output" voltage thereacross. Capacitance of $C_e$ farads is connected in parallel with thyristor 33, and resistance of $R_e$ ohms is connected across the thyristor in series with this capacitance. $R_e$ and $C_e$ are equivalent, respectively, to all resistors and capacitors in the snubber circuits associated with the even-numbered valves of the reverse bridge. In practice the equivalent circuit thus far described may have a damping factor $$\left(\frac{R_e^2 C_e}{4 L_e}\right)$$

that is relatively low (i.e., less than 0.25).

The switch 31 in FIG. 2 is periodically operative in a manner that subjects the series combination of $L_e$ and $C_e$ to a relatively abrupt voltage increase. To damp oscillations in the series combination on this occasion, the resistance $R_2$ is connected across the inductance $L_e$. The degree of damping depends on the ohmic value of $R_2$. By selecting an appropriate value for $R_2$, the overshoot factor of the circuit can be reduced to an acceptable level. By overshoot factor I mean the maximum ratio of the output voltage across the thyristor ($V_o$) to the driving voltage ($V_a$).

Given the damping factor of the original circuit and the maximum overshoot that is permissible, persons skilled in the art will know how to select the proper value of $R_2$. For added convenience, I have shown in FIG. 3 a family of curves representing overshoot factor vs. the quantity $$\frac{1}{R_2} \sqrt{\frac{L_e}{C_e}}$$

for a variety of damping factors that are typical of the equivalent circuit shown in FIG. 2. It should be noted that in plotting these curves I have ignored the equivalent resistance $R_e$ which is trivial if the damping factor is low.

Having selected the value of $R_2$, I reduce losses in the damping circuit without appreciable increasing the over-shoot factor by connecting in series therewith the inductance $L_2$ and capacitance $C_2$ which are tuned to the natural frequency of the original circuit. In other words, $L_2 C_2$ equals approximately $L_e C_e$. As a practical matter, significantly improved results will be obtained even if the ratio of these products were greater or less than one (e.g., between 1.33 and 0.75). The utility of the tuned damping circuit is improved by keeping $C_2$ as low as possible, consistent with the following two restraints.

$$\frac{R_2^2 C_2}{4 L_2} \geq 0.5$$

$$0.25 \leq \frac{(R_2 + R_e)^2 \left(\frac{C_2 C_e}{C_2 + C_e}\right)}{4 L_2} \leq 1$$

The first of these restraints is imposed to ensure that the tuned damping circuit itself is reasonably well damped. In the second restraint the fraction is the damping factor of the loop comprising the tuned damping circuit in combination with the output circuit $R_e C_e$; the economics of my invention becomes unfavorable if this damping factor is higher than 1.

As was previously mentioned, my tuned damping circuit can be connected alternatively in parallel with the snubber circuit. This possibility, which is illustrated by broken lines in FIG. 2, may be advantageous in forced commutation inverters or for any case where the main inductance $L_e$ is inaccessible.

When connected in this manner, my invention will beneficially augment the conventional damping function of the snubber capacitor on the occasion of turning off the thyristor 33.

While I have shown and described a preferred form of the invention by way of illustration, many modifications will probably occur to those skilled in the art. I therefore contemplate by the claims which conclude this specification to cover all such modifications as fall within the true spirit and scope of the invention.

What I claim as new and desire to secure by Letters Patent of the United States is:

1. In an electric power circuit comprising a thyristor, a capacitive reactance element connected in parallel with said thyristor, an inductive reactance element connected in series with the parallel combination of said thyristor and said capacitive reactance element, a plurality of input terminals adapted to be connected to a source of voltage, and means including controllable switching means for electrically interconnecting said input terminals and the series combination of said capacitive reactance element and said inductive reactance element, said switching means being periodically operative in a manner that subjects said series combination to a relatively abrupt change of voltage, the improvement comprising:

a tuned damping circuit connected in parallel with a predetermined one of said reactance elements, said damping circuit being characterized by resistance, inductance, and capacitance in series with one another, said resistance having an ohmic value selected to damp oscillations in said series combination on the occasion of said abrupt voltage change, and said inductance and said capacitance being tuned to approximately the natural frequency of said series combination.

2. The circuit of claim 1 in which said predetermined one reactance element is said inductive reactance element.

3. The circuit of claim 1 in which a resistor is connected across said thyristor in series with said capacitive reactance element.

4. In an electric power converter comprising a thyristor, a capacitive reactance element connected in parallel with said thyristor, an inductive reactance element connected in series with the parallel combination of said thyristor and said capacitive reactance element, a plurality of input terminals adapted to be connected to a source of voltage, a set of at least first and second output terminals, means including controllable switching means for electrically interconnecting said input and output terminals, said switching means having one recurrent state in which said first output terminal is energized in accordance with the electrical potential of a first one of said input terminals and being periodically operative to another state in which said first output terminal is energized in accordance with the electrical potential of another one of said input terminals, the series combination of said capacitive reactance element and said inductive reactance element being connected between said first output terminal and said first input terminal, whereby upon operation of said switching means the voltage across said series combination is subject to a relatively abrupt change, the improvement comprising:

a tuned damping circuit connected in parallel with a predetermined one of said reactance elements, said damping circuit being characterized by resistance, inductance, and capacitance in series with one another, said resistance having an ohmic value selected to damp oscillations in said series combination on the occasion of said abrupt voltage change, and said inductance and said capacitance being tuned to approximately the natural frequency of said series combination.

5. The converter of claim 4 in which means is provided for connecting said first output terminal directly to one side of an electric power load circuit and for connecting said second output terminal via a current limiting inductor to the other side of the load circuit.

6. The converter of claim 4 in which said input terminals are adapted to be connected to a source of 3-phase alternating voltage, means is provided for directly connecting said first output terminal to one side of an electric power load circuit and for connecting said second output terminal to the other side of the load circuit, and said controllable switching means comprises a group of six periodically conducting electric valves connected in a first bridge configuration between said input and output terminals, said valves being cyclically fired, when the first bridge is active, in a predetermined sequence so as to supply unidirectional current to the connected load circuit.

7. The subject matter of claim 6 wherein the converter comprises two groups of valves forming first and second duplicate bridges which share the same input terminals but have separate sets of output terminals, said bridges being alternatively active and their respective sets of output terminals being connected in oppositely poled relationship to said load circuit so that current can flow through said load circuit in a predetermined forward direction when the first bridge is active or in a reverse direction when said second bridge is active, each valve of said second bridge comprising at least one thyristor which is shunted by a capacitive reactance element; and said inductive reactance element is connected between the second output terminal of said second bridge and the first output terminal of said first bridge.

8. The converter of claim 7 in which said predetermined reactance element is said inductive reactance element.

9. The converter of claim 8 in which the first output terminal of said second bridge is directly connected to said other side of the load circuit, each valve of said first bridge comprises at least one thyristor which is shunted by a capacitive reactance element, an additional inductive reactance element is connected between the second output terminal of said first bridge and the first output terminal of said second bridge, and said additional inductive reactance element is shunted by another tuned damping circuit which is a duplicate of the tuned damping circuit specified in claim 1.

* * * * *